United States Patent
Girdzijauskas et al.

(10) Patent No.: US 9,235,920 B2
(45) Date of Patent: Jan. 12, 2016

(54) METHOD AND PROCESSOR FOR 3D SCENE REPRESENTATION

(75) Inventors: Ivana Girdzijauskas, Kista (SE); Markus H. Flierl, Täby (SE); Pravin Kumar Rana, Solna (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 96 days.

(21) Appl. No.: 14/366,896

(22) PCT Filed: Mar. 7, 2012

(86) PCT No.: PCT/SE2012/050255
§ 371 (c)(1), (2), (4) Date: Jun. 19, 2014

(87) PCT Pub. No.: WO2013/095248
PCT Pub. Date: Jun. 27, 2013

(65) Prior Publication Data
US 2014/0375630 A1    Dec. 25, 2014

Related U.S. Application Data

(60) Provisional application No. 61/579,180, filed on Dec. 22, 2011.

(51) Int. Cl.
*G06T 15/00*    (2011.01)
*G06T 7/00*    (2006.01)
(Continued)

(52) U.S. Cl.
CPC .............. *G06T 15/005* (2013.01); *G06T 7/0022* (2013.01); *G06T 9/001* (2013.01);
(Continued)

(58) Field of Classification Search
None
See application file for complete search history.

(56) References Cited

U.S. PATENT DOCUMENTS

| 5,754,939 A * | 5/1998 | Herz | G06Q 20/383 348/E7.056 |
| 6,701,005 B1 * | 3/2004 | Nichani | G06T 7/0028 345/419 |

(Continued)

FOREIGN PATENT DOCUMENTS

| EP | 1 355 274 A2 | 10/2003 |
| JP | 2004 287517 A | 10/2004 |

(Continued)

OTHER PUBLICATIONS

International Search Report; PCT Application No. PCT/SE2012/050255, Dec. 21, 2012.

(Continued)

*Primary Examiner* — Said Broome
(74) *Attorney, Agent, or Firm* — Myers Bigel Sibley & Sajovec, P.A.

(57) ABSTRACT

The present invention relates to three dimension (3D) scene representations and in particular to a method and a processor for providing improved 3D scene representations. An objective of the embodiments of the present invention is to improve the determination of consistency among a plurality of projections at a virtual view denoted vF. When determining the consistency, entries of a distance matrix, indicative of distance differences of 3D components between different views for a corresponding segment k when projected to the predefined view (vF) for each segment k, are compared with entries of a threshold matrix. The objective is achieved by assigning each segment k of a 3D component to a cluster based on individual rules for each cluster and one threshold matrix and by determining one threshold matrix for each cluster based on the segments of that cluster.

21 Claims, 17 Drawing Sheets

(51) Int. Cl.
*G06T 9/00* (2006.01)
*H04N 13/00* (2006.01)
*H04N 13/02* (2006.01)
*H04N 19/597* (2014.01)

(52) U.S. Cl.
CPC ............... *G06T 2207/10012* (2013.01); *G06T 2207/10028* (2013.01); *G06T 2207/30168* (2013.01); *G06T 2219/2008* (2013.01); *H04N 13/0048* (2013.01); *H04N 13/0282* (2013.01); *H04N 19/597* (2014.11)

(56) References Cited

U.S. PATENT DOCUMENTS

| 7,769,570 | B2* | 8/2010 | Mosterman | G06F 8/10 703/2 |
|---|---|---|---|---|
| 8,730,238 | B2* | 5/2014 | Salemann | G06T 17/00 345/419 |
| 8,872,851 | B2* | 10/2014 | El Choubassi | G06T 7/0081 345/633 |
| 9,002,121 | B2* | 4/2015 | Cai | G06T 17/10 345/420 |
| 2007/0020642 | A1 | 1/2007 | Deng et al. | |

FOREIGN PATENT DOCUMENTS

| WO | WO 2004/032061 A2 | 4/2004 |
| WO | WO 2011/129735 A2 | 10/2011 |
| WO | WO 2012/010220 A2 | 1/2012 |

OTHER PUBLICATIONS

Written Opinion of the International Searching Authority, PCT Application No. PCT/SE2012/050255, Dec. 21, 2012.
Marr et al, "Cooperative Computation of Stereo Disparity", Massachusetts Institute of Technology Artificial Intelligence Laboratory, A.I. Memo 364, Jun. 1976, 21 pp.
Rana et al. "Depth Consistency Testing for Improved View Interpolation" *2010 IEEE International Workshop on Multimedia Signal Processing (MMSP)*, Oct. 4-6, 2010, pp. 384-389.
Scharstein et al., "A Taxonomy and Evaluation of Dense Two-Frame Stereo Correspondence Algorithms", *International Journal of Computer Vision*, Vo. 47, No. 1-3; Apr.-Jun. 2002, pp. 7-42.
Smolic et al., "Three-Dimensional Video Postproduction and Processing", *Proceedings of the IEEE*, vol. 99, No. 4, Apr. 2011, pp. 607-625.
Supplementary European Search Report, Application No. EP 12 85 9969, Jun. 8, 2015.

* cited by examiner

METHOD AND PROCESSOR FOR 3D SCENE REPRESENTATION

CROSS REFERENCE TO RELATED APPLICATIONS

This application is a 35 U.S.C. §371 national stage application of PCT International Application No. PCT/SE2012/050255, filed on 7 Mar. 2012, which itself claims priority to U.S. provisional Patent Application No. 61/579,180, filed 22 Dec. 2011, the disclosure and content of both of which are incorporated by reference herein in their entirety. The above-referenced PCT International Application was published in the English language as International Publication No. WO 2013/095248 A1 on 27 Jun. 2013.

TECHNICAL FIELD

The present invention relates to three dimension (3D) scene representations and in particular to a method and a processor for providing improved 3D scene representations.

BACKGROUND

The research in 3D has gained considerable momentum in recent years, and there is a lot of interest from industry, academy and consumer society. Several 3D movies are being produced every year, providing compelling stereoscopic effects to its audience. It is however already possible to enjoy 3D experience at home, and in the very near future, mobile phones will be 3D-enabled.

The term 3D is usually connected to stereoscopic experience, where user's eyes are provided with slightly different images of a scene which are fused by the brain to create depth impression. However, there is much more to 3D. For example, free viewpoint television (FTV) is a TV system that allows users to have a 3D visual experience while freely changing their position in front of a 3D display. Unlike the typical stereoscopic television, which enables a 3D experience to users that are sitting at a fixed position in front of a screen, FTV allows to observe the scene from many different angles, as if we were there.

The FTV functionality is enabled by multiple components. The 3D scene is captured by many cameras and from different views or angles—the so-called multiview video. Different camera arrangements are possible, depending on the application. For example, it may be as simple as a parallel camera arrangement on a 1D line, whereas in more complex scenarios it may include 2D camera arrays forming an arc structure.

Multiview video can be relatively efficiently encoded by exploiting both temporal and spatial similarities that exist in different views. The first version of multiview video coding (MVC) was standardized in July 2008. (MVC is an extension to H.264/AVC.) However, even with MVC, the transmission cost remains prohibitively high. This is why only a subset of the captured multiple views is actually being transmitted. To compensate for the missing information, depth and disparity maps can be used instead. A depth map is a simple greyscale image, wherein each pixel of the map indicates the distance between the corresponding pixel from a video object and the capturing camera. Disparity, on the other hand, is the apparent shift of a pixel which is a consequence of moving from one viewpoint to another. Depth and disparity are mathematically related. The main property of depth/disparity maps is that they contain large smooth surfaces of constant grey levels. This makes them much easier to compress with current video coding technology.

From the multiview video and depth/disparity information it is possible to generate virtual views at an arbitrary viewing position. This can be done by e.g. projection. A view synthesized from texture and depth usually has some pixels unassigned which usually are called holes. This can happen due to rounding errors, and in that case the holes can usually be easily fixed by e.g. median filtering. Another reason is that some pixels/regions in the virtual view may not be visible in the existing view(s) and vice versa. These pixels/regions are called either occluded or disoccluded regions respectively. They can be used in addition to texture and depth, to improve the quality of the synthesized view.

Hence, texture, depth maps, disparity maps and occlusions referred herein as to 3D components, are used to enable the FTV functionality. Alternatively, they can be used to build a 3D model of a scene etc. The main problem that arises in practice is that these 3D components are rarely perfectly consistent. For example, the colors in multiview textures can be slightly unbalanced, which may create an annoying stereo impression.

The problem gets even more evident for depth/disparity/occlusion maps, which are usually estimated rather than measured, due to the cost of the measuring equipment. Thus, in addition to inconsistency, these 3D components often suffer from a poor or at least unacceptable quality. There is a wealth of depth/disparity estimation algorithms in the literature, but they still suffer from many problems such as noise, temporal or spatial inconsistency and incapability to estimate depth/disparity for uniform texture regions etc. Even the measured depth maps can be noisy or may fail on dark objects in the scene. This is the problem with infrared cameras for example, where the dark regions absorb most of the light.

It is clear that inconsistent and poor quality 3D components create many artifacts in rendered views of a 3D scene, leading to unacceptable quality in 3D experience. For example, using inconsistent depth maps in view synthesis creates ghost images, which are especially visible at object boundaries. This is called ghosting. On the other hand, depth map(s) may be temporally unstable, which leads to flickering in the synthesized view. These are only some of the examples which make the stereo impression annoying.

In WO2011/129735, a method for improving 3D representation was proposed. That was achieved by combining multiple available 3D components, captured at different views.

The available 3D components which are denoted $s_1, \ldots, s_N$, $N \geq 3$, are captured at positions $v_1, \ldots, v_N$ in a common (or global) coordinate system, were projected to a virtual position vF in a given common coordinate system, resulting in $p_1, \ldots, p_N$. This is depicted in FIG. 1 for N=4. The 3D components are exemplified as texture (image/video), depth (range) data, disparity map, occlusion data or any other form which can describe a 3D scene. Projection can be done, for example, with an image warping algorithm. Then the projections $p_1$-$p_N$ are segmented. The segments can be single pixels, groups of pixels, regular square or rectangular blocks, irregular areas, foreground/background objects etc. The projected components can also be transformed to another space, before a distance function is applied to pairs of projected components. For each segment k, a distance matrix $D^k=[D^k]_{ij}$ was defined reflecting the similarity of the projected values of each segment at the virtual position vF. I.e. segment k captured at view i is compared with segment k captured at view j, which implies that segments from the captured views are compared and inserted in the distance matrix Dk. The calculated distances $[D^k]_{ij}$ may be compared to a set of given threshold values, $T^k=[T_{ij}]^k$, where k,i,j ∈ {1,2, ..., N}. Based on the level of consistencies of the 3D components as well as which and how many 3D components are consistent, a unique 3D representation at the virtual position can be determined which will be used when representing the 3D scene. Instructions on how to calculate this unique representation, based on e.g. the consistency are described in WO2011/129735.

SUMMARY

In order to improve the method disclosed in WO2011/129735, an object of the embodiments of the present invention is to determine a better 3D representation at a virtual (also referred to as predefined) view denoted vF by improving the determination of consistency among a plurality of projections at the virtual view vF.

When determining the consistency, entries of a distance matrix, indicative of distance differences between different views for a corresponding segment k when projected to the predefined view (vF) for each segment k, are compared with entries of a threshold matrix. The object is achieved by assigning each segment k of a 3D component to a cluster based on individual rules for each cluster and a threshold matrix is determined for each cluster based on the segments of that cluster.

According to embodiments of the present invention the individual rules are dependent on the number of off-diagonal zero elements of the distance matrix. This implies that the segments may be divided into clusters depending on the number of the distance matrix' non-zero off-diagonal elements, wherein one threshold matrix is determined for each cluster based on the cluster's segments. In this way, the determination of the consistency can be improved.

According to a first aspect of embodiments of the present invention, a method in a processor for representing a 3D scene is provided. In the method, a 3D component of the 3D scene to be represented, captured at at least three different views, is projected to a predefined view. A value is determined for each of the projected 3D component captured at at least three different views. Further, clusters are defined wherein each cluster will be assigned a set of segments of a 3D component, for each cluster an individual rule is defined for assigning segments of a 3D component to the respective cluster, and each segment of the 3D component is being assigned to a cluster based on the individual rules. Consistency among the projected 3D components captured at at least three different views is detected by comparing entries of a distance matrix with a threshold matrix. The distance matrix is indicative of distance differences between the at least three different views for the corresponding segment k when projected to the predefined view for each segment k. Thus, the threshold matrix is determined based on the segments of the cluster. Then consistency values are determined for each cluster individually and the determined values and the consistency value are used when representing the 3D scene at the predefined view.

According to a second aspect of embodiments of the present invention, a processor for representing a 3D scene is provided. The processor comprises a projecting unit configured to project to a predefined view a 3D component of the 3D scene to be represented, captured at at least three different views to determine a value for each of the projected 3D component captured at at least three different views. Further, the processor comprises a cluster managing unit configured to define clusters, wherein each cluster will be assigned a set of segments of a 3D component, to define for each cluster an individual rule for assigning segments of a 3D component to the respective cluster, and to assign each segment of the 3D component to a cluster based on the individual rules. The processor also comprises a consistency detecting unit configured to detect consistency among the projected 3D components captured at at least three different views and the consistency detecting unit is further configured to compare entries of a distance matrix, indicative of distance differences between the at least three different views for the corresponding segment k when projected to the predefined view for each segment k, with a threshold matrix, wherein the threshold matrix is determined based on the segments of the cluster, and to determine consistency values for each cluster individually. Further, the processor is configured to use the determined values and the consistency value when representing the 3D scene at the predefined view.

According to a third aspect of embodiments of the present invention, a 3D rendering device comprising a processor according to the second aspect is provided.

An advantage with embodiments of the present invention is that the clustering of the segments prior to consistency checking makes it possible to determine the threshold values based on local statistics of different segments within the corresponding cluster. This turns out to be beneficial as different segments can have very different statistical properties. This subsequently leads to improved quality of 3D scene representations compared to cases when threshold values are calculated from an entire set of segments.

Another advantage with embodiments of the present invention is that the numbers of clusters and sub-clusters can be flexibly modified to adapt to different segments of 3D components as is the case with background texture, and foreground depth of 3D scenes for example.

DETAILED DESCRIPTION

Figure 1:
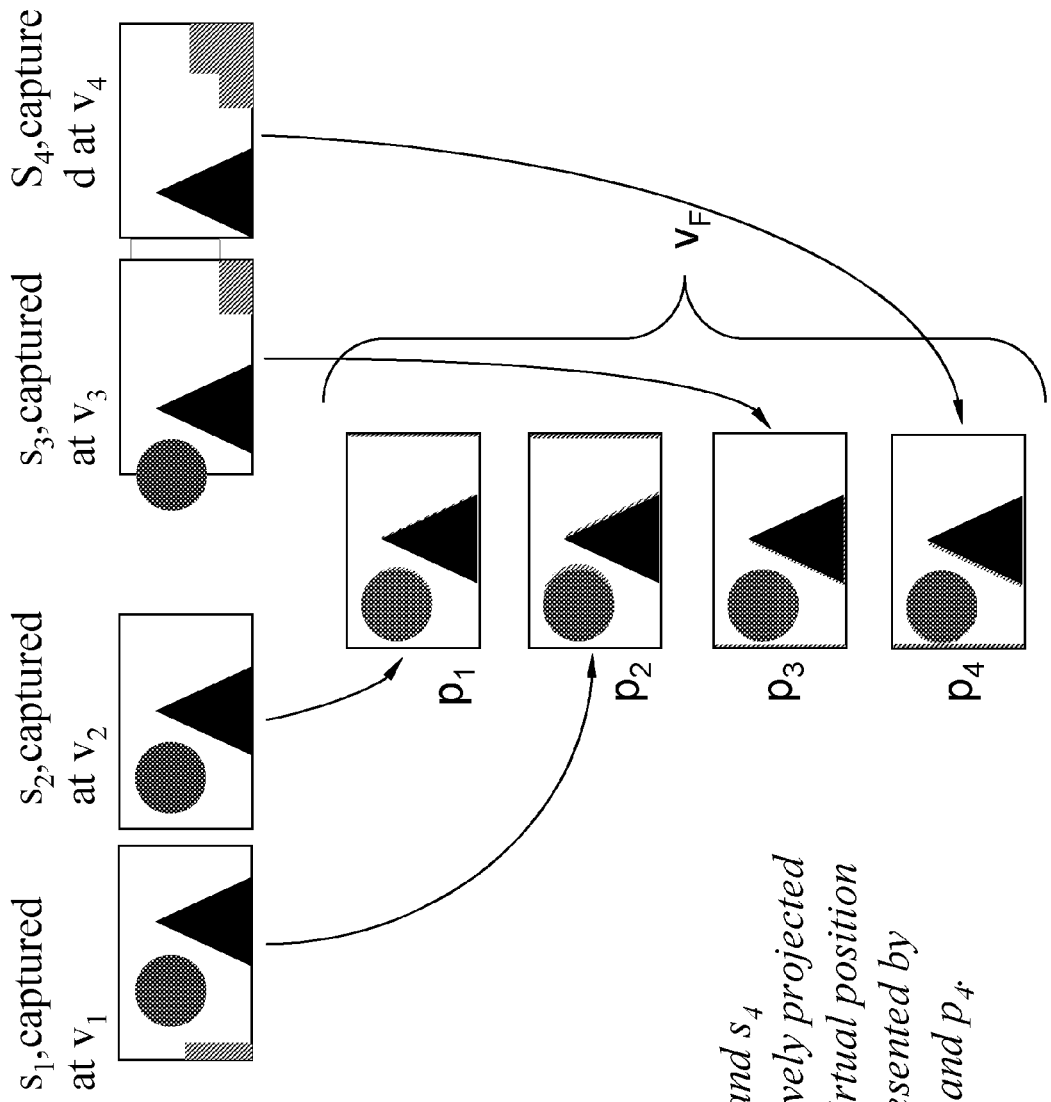
FIG. 1 illustrates projecting of multiple 3D scenes to a virtual position according to embodiments of the present invention.

The embodiments of the present invention will be described more fully hereinafter with reference to the accompanying drawings, in which preferred embodiments of the invention are shown. The embodiments may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current embodiments are primarily described in the form of methods and devices, the embodiments may also be embodied in a computer program product as well as a system comprising a computer processor and a memory coupled to the processor, wherein the memory is encoded with one or more programs that may perform the functions disclosed herein.

The embodiments of the present invention relate to multiview alignment for 3D representations, i.e. multiple existing views comprising 3D components are used to synthesize the 3D components at a virtual view. For multiview alignment it is assumed that a given number of 3D $s_1, \ldots, s_N$ are available where $N \geq 3$, and a 3D component imply texture (image/video), depth (range) data, disparity map, occlusion data or any other form of description for a 3D scene. These existing components, $s_1, \ldots, s_N$, are captured or estimated at various viewpoints $v_1, \ldots, v_N$ in a common local or global coordinate system. It should be noted here that the subscript indices correspond to the distinct positions in this coordinate system. The existing views $s_1, \ldots, s_N$ are then projected to a virtual position vF in a given common coordinate system, resulting in p1, ..., pN. This is depicted in FIG. 1 for N=4.

Figure 2A:
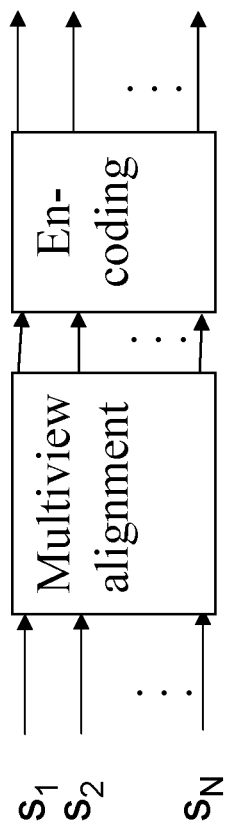
FIG. 2 illustrates multiview alignment on the transmitter and receiver side according to embodiments of the present invention.
Figure 2B:
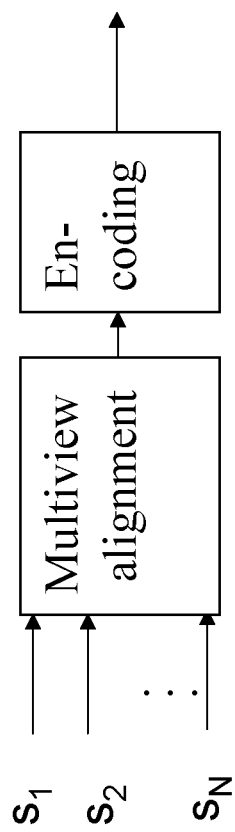
Figure 2C:
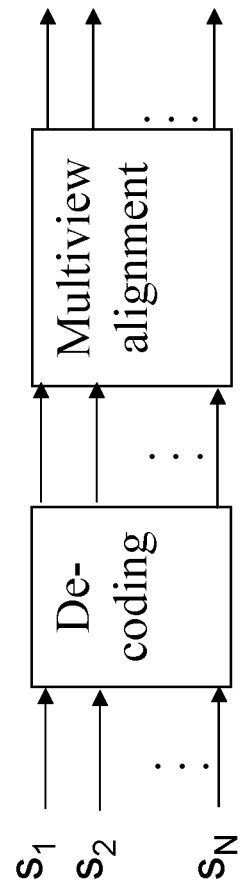

As illustrated in FIG. 2a, multiview alignment can be performed before encoding, which results in that the aligned components are more efficiently encoded. Hence multiple representations are sent for encoding. As an alternative, a single representation is sent for encoding as illustrated in FIG. 2b. Moreover, as illustrated in FIG. 2c, multiview alignment can also be performed after decoding, which helps to fix possible coding artefacts.

Figure 3:
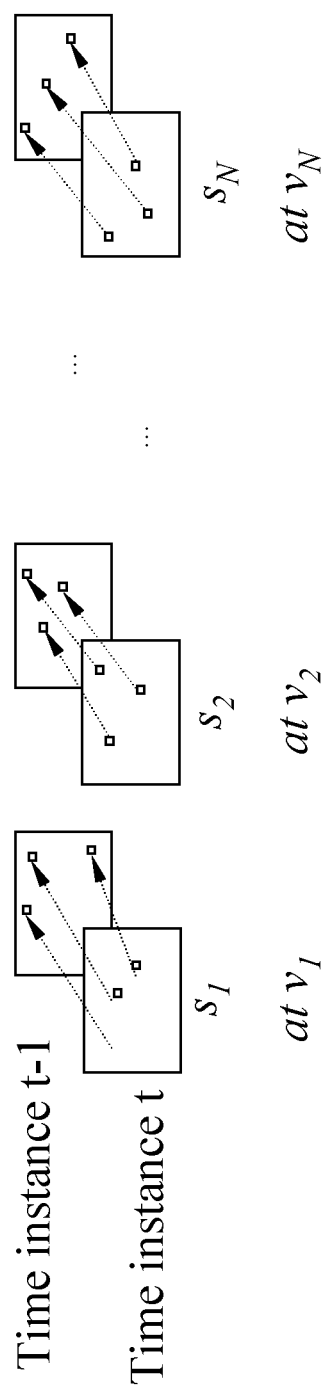
FIG. 3 shows that both $s_1, \ldots, s_N$ and their motion compensated realizations at previous time instances can be taken as inputs for multiview alignment according to embodiments of the present invention.

Further, the 3D components $s_1, \ldots, s_N$ captured at views $v_1, \ldots, v_N$ may include not only the 3D components which are all captured at the same time instance but they might as well include motion compensated versions of the viewpoints in previous time instance(s). In this way, the temporal dependencies are taken into account, which subsequently leads to reduced flickering artifacts etc. Alternatively, only the parts with no motion can be considered i.e. usually the background, which leads to more stable non-moving regions reconstruction. FIG. 3 illustrates this principle. The arrows in FIG. 3 are motion vectors, which indicate the displacement of blocks between the previous and the current time instance. The information from the previous time instances can therefore provide additional information. This is very important for e.g., depth maps, where each frame is usually estimated independently from previous frames.

The embodiments of the present invention uses information from $s_1$-$s_N$ captured at $v_1, \ldots, v_N$ to extract and/or improve the information at an arbitrary position $v_F$. If $v_F$ corresponds to one of the $v_1$-$v_N$, then the quality of a particular representation using the remaining ones is improved. If this is not the case, then a representation in the new position $v_F$ is simply synthesized. For that information is extracted from all the available inputs $s_1$-$s_N$ by filtering or fusing.

Figure 4A:
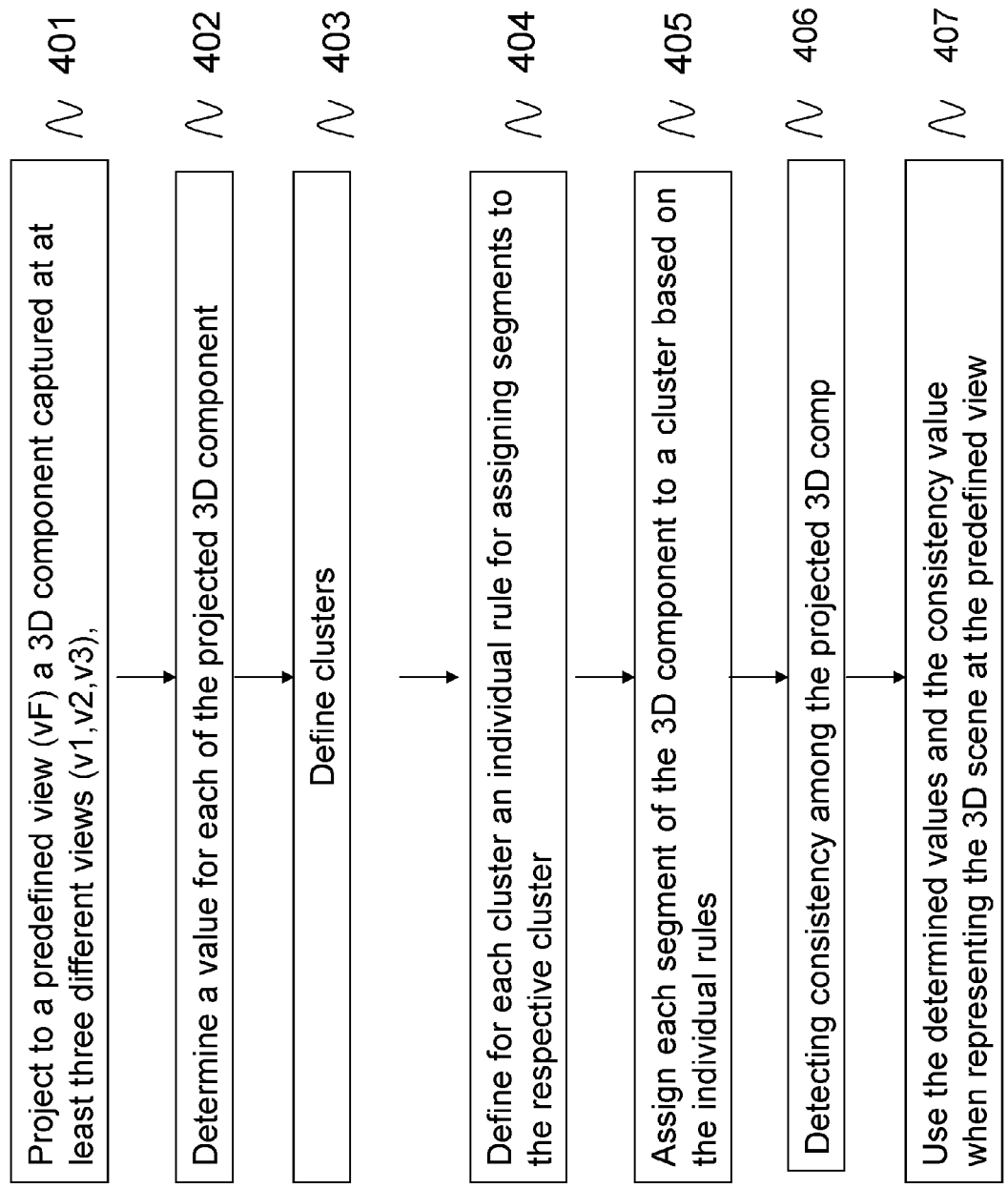
FIGS. 4a and 4b are flowcharts of the method according to embodiments of the present invention.
Figure 4B:
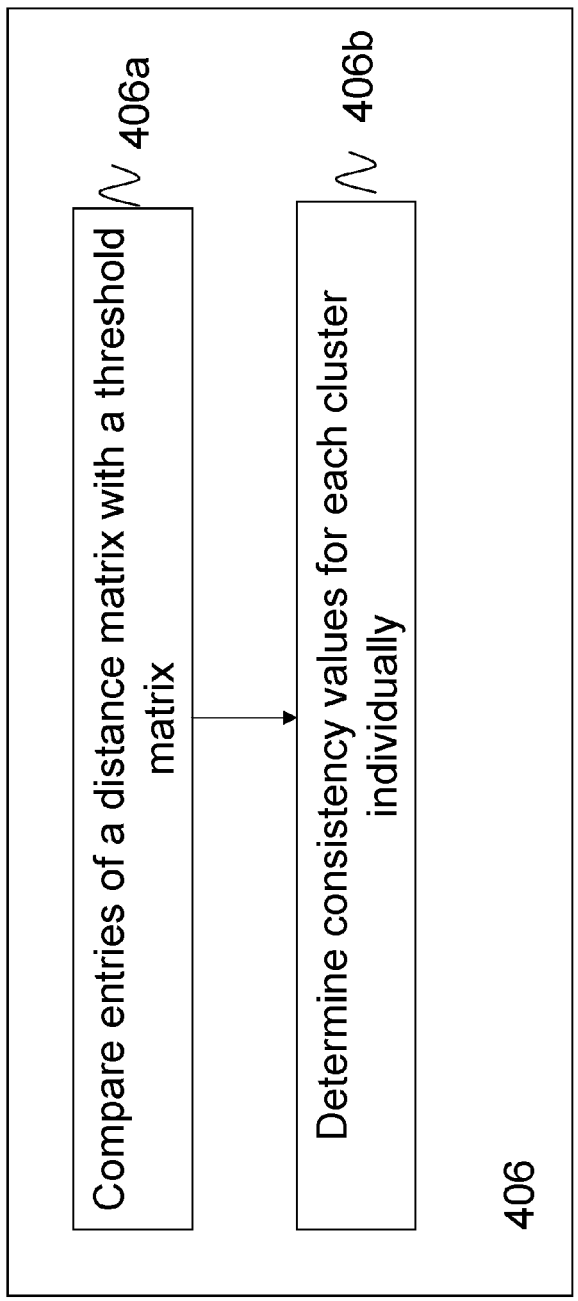

In the first step 401 as shown in the flowchart of FIG. 4, a respective 3D component $s_1, \ldots, s_N$ captured at a respective viewpoint $v_1, \ldots, v_N$, are projected to a position vF. This is also illustrated in FIG. 1. That results in the projected representations of the 3D components denoted by $p_1, \ldots, p_N$. This can be done, for example, with an image warping algorithm. Then the $p_1, \ldots, p_N$ are segmented into individual segments indexed by k. In the simplest case, a segment may contain a single pixel, but groups of pixels, regular square or rectangular blocks, irregular areas such as superpixels, foreground/background objects, etc are also envisaged. The segmentation depends on the type of input, the complexity restrictions, the need to preserve some local structure properties, etc.

Because the 3D components $s_1$-$s_N$ are not perfect, due to noise, etc, the projection to $v_F$ might give inconsistent values for some projected segments, thus creating uncertainty about their true values in these positions. Moreover, the projection may leave some 3D points or regions as "holes", since some regions which are visible in some of the original inputs are hidden (or equivalently occluded/concealed/covered) in some others. The holes are usually located along the borders of objects and, in general, the further away from vF the original viewpoint is, the more holes in the virtual viewpoint will be visible.

The next step is to determine 402 a value for each of the projected 3D components. According to embodiments of the present invention, clusters are defined 403 wherein each cluster will be assigned a set of segments of a 3D component. For each cluster, an individual rule for assigning segments of a 3D component to the respective cluster is defined 404. Then, each segment of the 3D component is being assigned 405 to a cluster based on the individual rules.

In accordance with embodiments of the present invention, the consistency among the projected 3D components captured at at least three different views is detected by comparing 406a entries of a distance matrix with a threshold matrix, wherein the threshold matrix is determined based on the segments of the cluster. The distance matrix is indicative of distance differences between the at least three different views for the corresponding segment k when projected to the predefined view (vF) for each segment k. Hence one threshold matrix is determined per cluster and the threshold matrix is determined based on the segments assigned to that cluster. Further, consistency values are determined 406b for each cluster individually.

Then the determined values and the consistency value are used 407 when representing the 3D scene at the predefined view.

Accordingly, the distance matrix is used to determine consistency, i.e. to determine whether the different projected views agree with each other. In doing that and for each segment k of K segments, which may be a single pixel or groups of pixels, regular square or rectangular blocks, irregular areas such as superpixels, foreground/background objects, and in each of the projected views the distance matrix is defined as $D=\{D_{ij}^k\}$, where:

$$D_{ij}^k = F(b_i^k, b_j^k),$$

where F denotes the distance function between the k-th segment in view i and j ($b_i$ and $b_j$) respectively. If the k-th segment corresponds to single pixels, $b_i$ and $b_j$ are represented as scalars (pixel intensities; for example grayscale values, RGB, etc), while in other cases they have a vector form (that is, if block based segmentation is used then the k-th segment will be converted into a vector before being used in the above metric). Hence the determined value in step 402 may be $b_i$ and $b_j$. The distance function F should fulfill the properties of a metric e.g. non-negativity, identity of indiscernible, symmetry and the triangular inequality. Therefore the distance function F is symmetric. An example of a distance function F is the Euclidean distance. The distance function F may also be a function in a different domain like the frequency domain. For example, let's consider DCT (Discrete cosine transform), DST (Discrete sine transform), wavelet or any other domain. In that case the original values are transformed into the new domain and then the function F is applied on the transformed projected views.

It should be noted here that, since the distance function F is symmetric, then the matrix D is symmetric as well, and therefore only its upper triangular part needs to be considered.

Clusters are then defined 403 according to the following description, wherein each cluster will be assigned a set of segments of a 3D component. For each cluster, an individual rule for assigning segments of a 3D component to the respective cluster is defined 404. Then, each segment of the 3D component is being assigned 405 to a cluster based on the individual rules.

The values $D_{ij}^k$ in D are compared with threshold values $T_{ij}^k$ to evaluate whether there is consistency between different projected views. These values can either be constant or time varying scalars or matrices. An example of a time varying threshold is the case where motion information (temporal domain) provides information that there are rapid scene changes. In that case the human eye loses its ability to track temporal inconsistencies. Therefore the threshold to be used to check for consistency in scenes with rapid scene changes can be different from a threshold to be used for a static scene.

According to the embodiments, the threshold matrix is determined based on the segments of the cluster. Thus consistency values are determined 406b for each cluster individually.

When the threshold(s) is (are) applied, the projections $p_i$ and $p_j$ are considered to be consistent in a specific segment k if $D_{ij}^k \leq T_{ij}^k$.

It should be noted here that the holes created during projection are not considered in the consistency check. That means that for each segment, only the inputs that are hole-free are considered as inputs for the distance matrix calculation and the subsequent steps.

Figure 6:
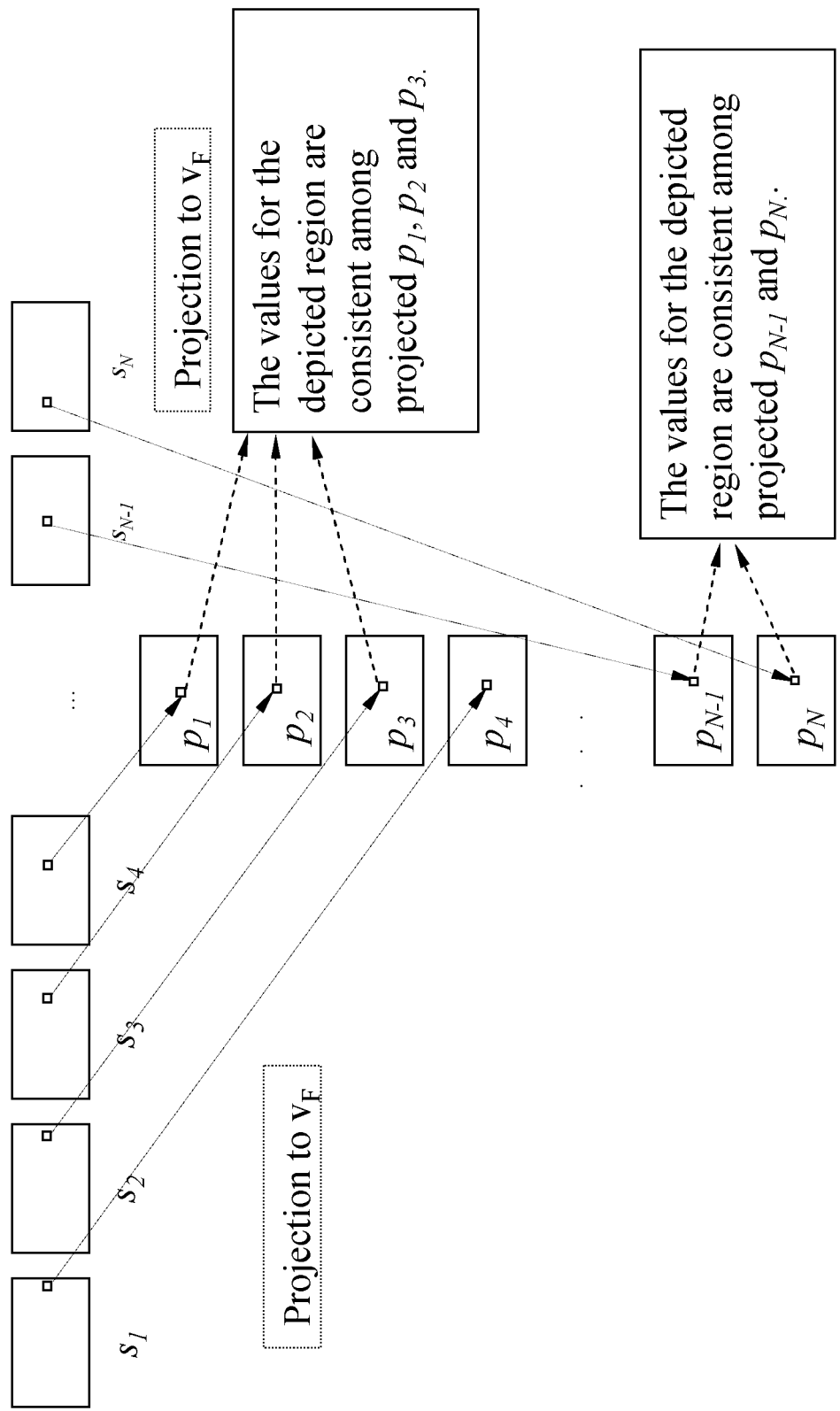
FIG. 6 illustrates a consistency check according to embodiments of the present invention.

The consistency check may give various outcomes. For example, multiple segment combinations may be pair-wise consistent, or some M-tuples are consistent with each other whereas some other P- or Q-tuples are consistent, where M≤N, P≤N and Q≤N. Accordingly, FIG. 6 shows a consistency check among multiple 3D scene components. In this example, the projection $p_1$, $p_2$ and $p_3$ are consistent, and the projections $p_{N-1}$ and $p_N$ are separately consistent. If the projections $p_1, \ldots, p_N$ are used for improving their own representation (e.g., $s_1, \ldots, s_N$ are textures which have to be improved), then it is possible to correct all the projections $p_1, \ldots, p_N$ by using the consistency value which is further explained below. On the other hand, if $p_1, \ldots, p_N$ are the projected depth maps and if they are e.g., used to improve the texture, the calculated consistent depth value and the corresponding consistency information for the projected views $p_1, \ldots, p_N$ can help to improve, for example, the projected texture information.

It should be noted that the determined value may be replaced with the determined consistency value on at least one of the three projected 3D components. The determined value on all projected 3D components may not be replaced under various conditions such as disocclusion areas, inconsistency between the depth values among maps, etc.

Furthermore, the consistency value can also be used to update the 3D component of the original observation by backward warping.

A set of rules can be applied when determining the consistency value. For example, a rule can be to simply use the average or the median of the values on the majority of the consistent projections as the consistency value. Or, if e.g. P projections agree on one value, and Q≤P on another one, it is possible to decide on the value that Q projections provide, if they have smaller distances to zero than to the threshold. Alternatively, it is possible to choose the value which gives the smallest distance, regardless of how many projected signals are consistent with respect to that value. There should also be a rule for the case when the consistency check returns an empty set. In that case it is possible, for example, to choose the average of all the segment values, or it may even be left unassigned and decided on in a subsequent step.

Once the rule has been applied to determine the consistency value and to replace the determined value, a better quality representation is obtained at the virtual viewpoint for the p1, . . . , pN. If there still are unassigned values from previous steps, values can be assigned by e.g., taking the correlation with the spatial neighborhood into account. The obtained representation may further be post-processed, in order to e.g., reduce the noise. Now an improved 3D representation pF is obtained.

As stated above, one of the 3D components can be exemplified by depth information. It should however be noted that the scope of the embodiments also comprise disparity maps as a 3D component. Another example of a 3D component is a texture map if illumination conditions are uniform or known. In this case the illumination conditions need to be compensated for.

As mentioned above, threshold matrices are determined by clustering the distances of the distance matrix and determining a threshold matrix for each cluster based on the distances of each cluster according to embodiments of the present invention.

How to cluster the distances of the distance matrix is further described below.

Hence it is suggested how to find the threshold values used for consistency checking between segments in projections p1-pN. It should be noted that it is also possible to consider actual pixel differences between the projected values, apart from other ways of calculating $D^k$. In that case, $D^k$ is symmetric due to properties of the distance function F.

In the embodiments of the present invention, once the distance values of $D^k$ are calculated for all projected k segments, the segments are classified into a number of clusters. Segment classification is based on the intrinsic statistical properties of the corresponding difference matrix $D^k$. According to embodiments, more precisely, the presence and number of off-diagonal zero elements in $D^k$ can drive the clustering process, as the presence of off-diagonal zero elements indicates that values within segment k are consistent between different projections. Moreover, the number of these elements indicates the reliability of measurement.

Figure 5:
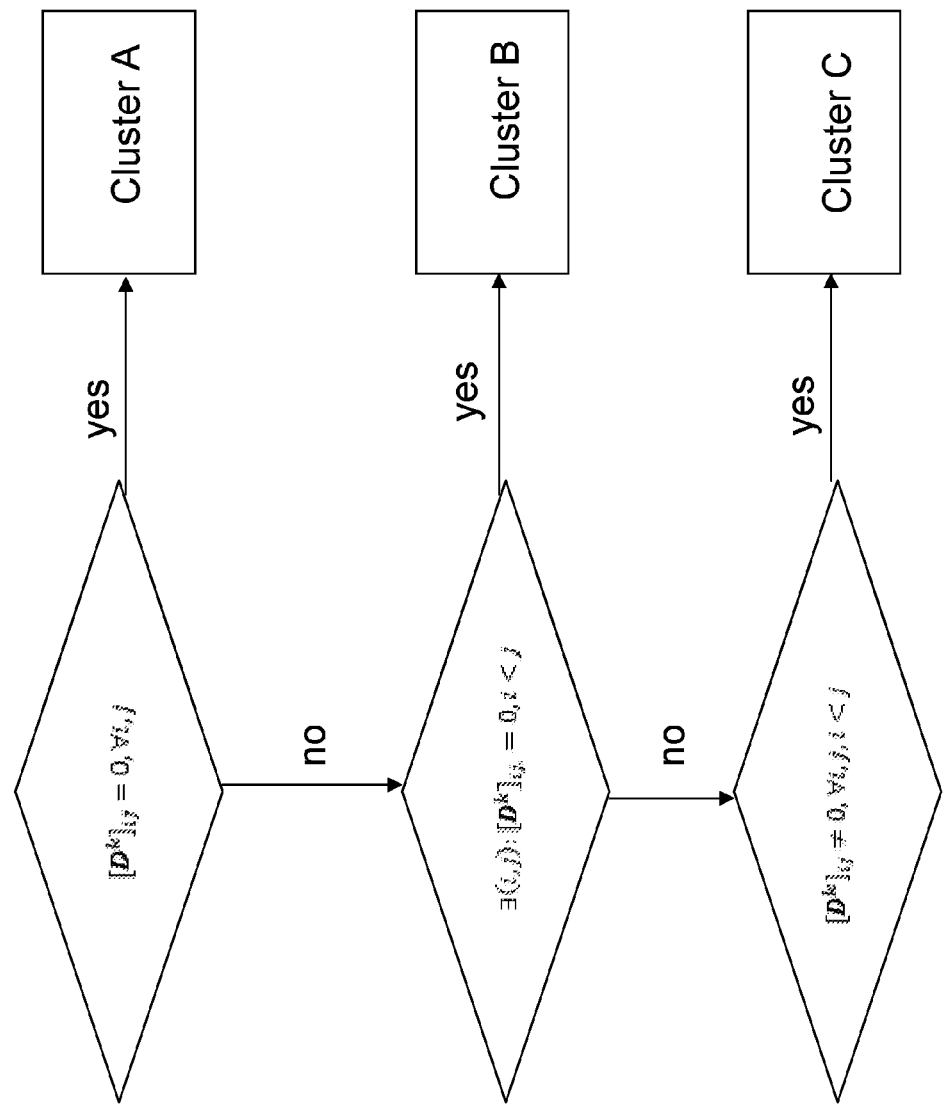
FIG. 5 illustrates the clustering process according to embodiments of the present invention.

With reference to FIG. 5, the steps of the clustering process of the embodiments is to define the clusters, define individual rules for each cluster and classify or assign the segments into the clusters according to the defined individual rules. The clusters may be defined as a first cluster, referred to cluster A, a second cluster referred to cluster B and to a third cluster, referred to cluster C. The assignment of the segments to the clusters can be performed according to the following rules:

A segment k falls in the cluster A if the corresponding matrix Dk is a null or a zero matrix. Mathematically, that can be expressed as:

$$[D^k]_{ij}=0, \forall i,j$$

For segments in the cluster A, corresponding projected 3D component values from all available 3D components are consistent and describe the same 3D object or object point in global coordinates.

Furthermore, a segment k falls in the cluster B if the corresponding matrix $D^k$ has at least one, but not all, off-diagonal element equal to zero. Mathematically, $$\exists(i,j):[D^k]_{i,j}=0, i<j$$

This guarantees that at least one consistent 3D component segment pair exists in cluster B.

A segment k falls in the cluster C, if the corresponding matrix $D^k$ has all non-zero off-diagonal elements. Mathematically, $$[D^k]_{ij} \neq 0, \forall i,j, i<j$$

For segments in cluster C, the corresponding projected 3D component values from all 3D components are inconsistent. Thus the initial clustering separates the most reliable measurements (cluster A) from partially reliable measurements (cluster B) and non-reliable measurements (cluster C).

Clusters B and C may be subject to further sub-clustering depending on their intrinsic statistical properties. These sub-clusters are treated as the clusters. I.e. one threshold matrix is determined per sub-cluster and the threshold matrix is determined based on the segments assigned to that sub-cluster. For that purpose, a set of pre-defined individual rules for the sub-clustering can be defined. These individual rules are also referred to as sub-clustering criteria. The sub-clustering can be done based on a sub-clustering criterion that considers also the off-diagonal elements or the none-zero off diagonal elements.

An example of a sub-clustering criterion is the maximum number of segments that belong to a cluster. Clusters having more elements than a predefined value may be split to sub-clusters due to complexity reasons.

Figure 7:
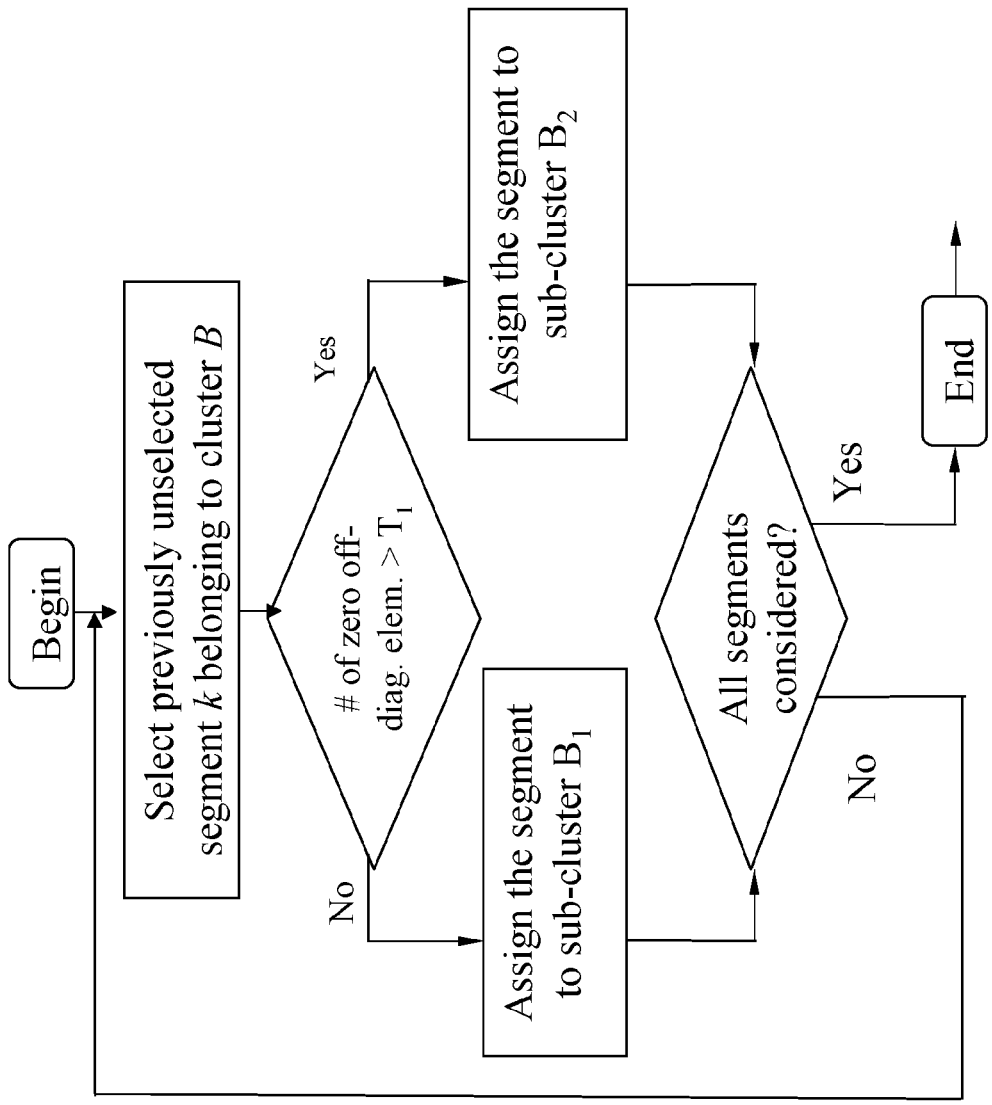
FIGS. 7-9 illustrates sub-clustering of cluster B according to embodiments of the present invention.
Figure 8:
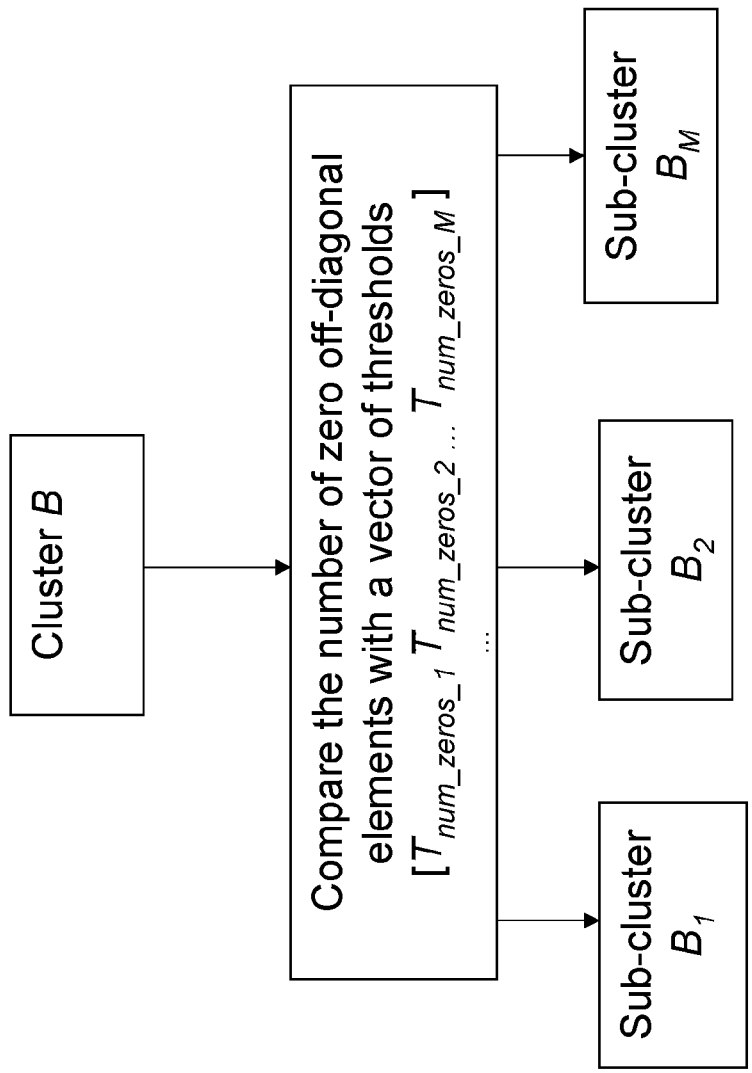
Figure 9:
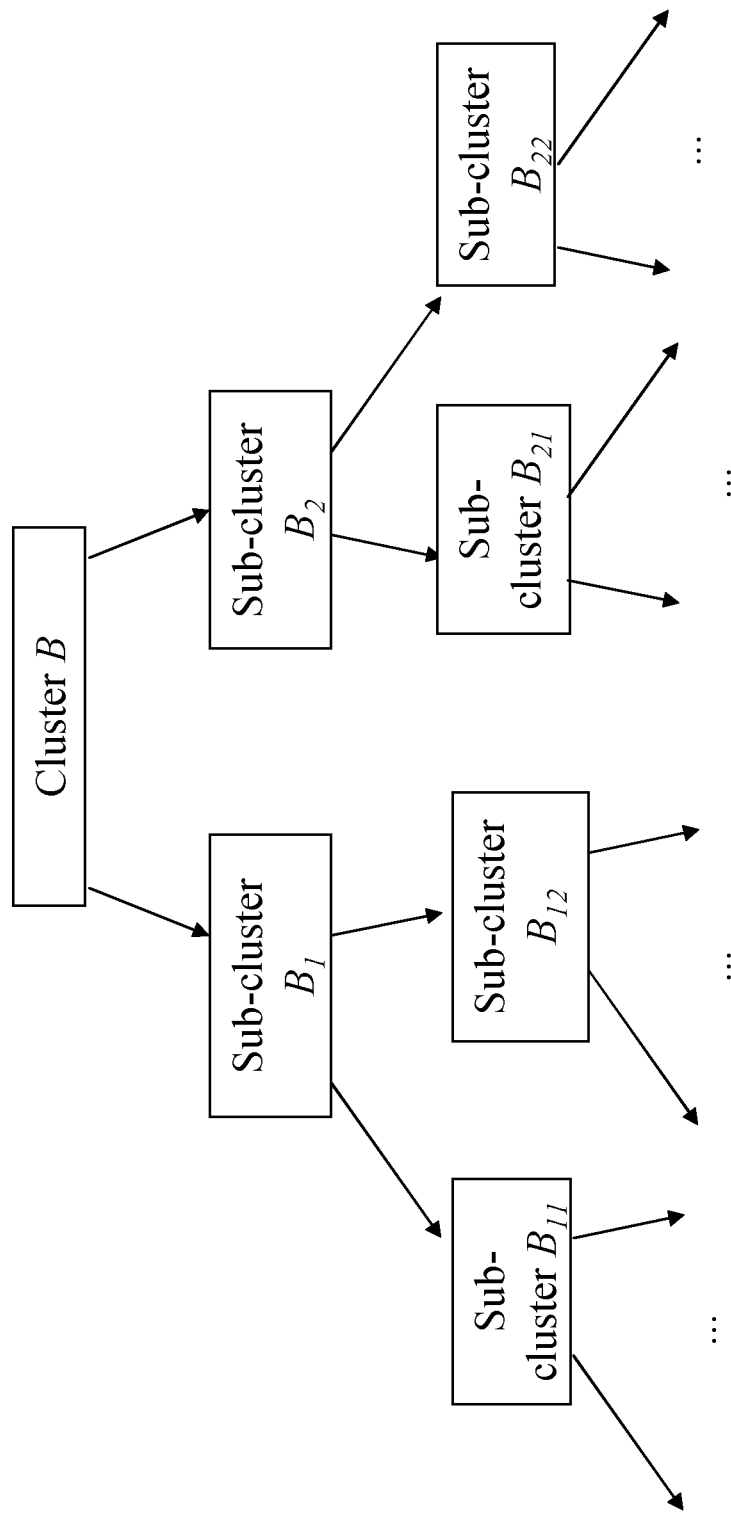

Another example is sub-clustering based on the statistics of elements within a matrix Dk. Hence the sub-clustering is done based on sub-clustering criterion that consider also the off-diagonal elements. One such criterion can be the number of zero off-diagonal elements for segments in cluster B, which is illustrated in FIG. 7. In this case, if the number of zero off-diagonal elements is lower than a predefined threshold T1, the segment will be attributed to a sub-cluster of "weakly-consistent" segments B1. Otherwise, it will belong to a sub-cluster of "highly-consistent" segments B2. It is also possible to split a cluster into multiple sub-clusters depending on a predefined vector of thresholds on the number of zero off-diagonal elements for each sub-cluster: [T1_1 T1_2 . . . T1_M], where M is the number of sub-clusters as illustrated in FIG. 8. Likewise, clusters can be sub-clustered in a hierarchical fashion, where at each stage a sub-cluster can be further divided based on some criteria as illustrated in FIG. 9.

Further, the cluster C can be divided in an analog way. Instead of a number of zero off-diagonal elements as for cluster B, it is possible to consider the statistics of values in $D^k$, which implies that the sub-clustering is done based on sub-clustering criterion that consider also the none-zero off-diagonal elements. Alternatively, transformed values such as normalized values of non-zero elements can be considered.

Figure 10:
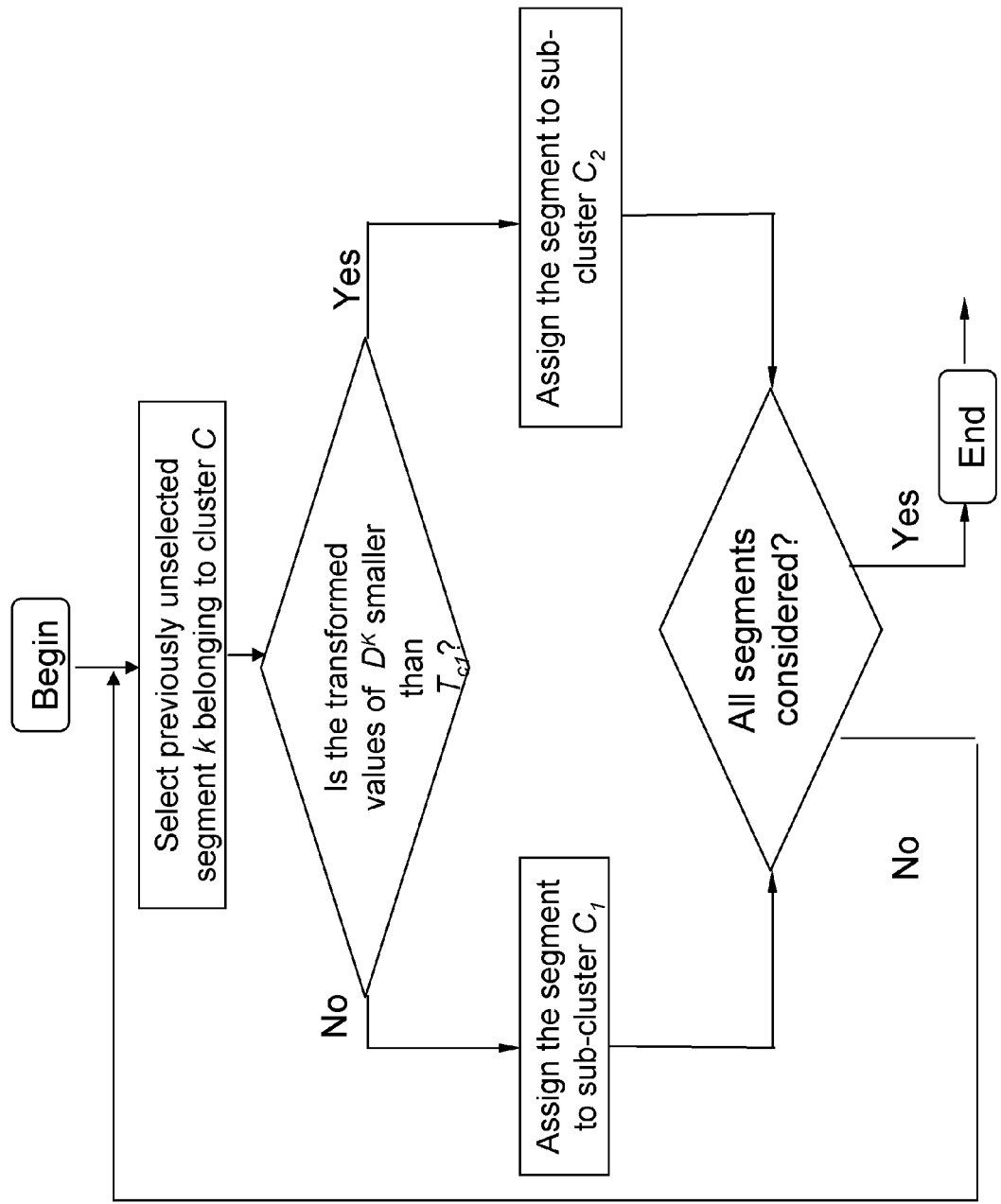
FIGS. 10-12 illustrates sub-clustering of cluster C according to embodiments of the present invention.

With reference to FIG. 10, the cluster C can be split into two sub-clusters, C1 and C2 in the following way: a segment k in the cluster C is assigned to cluster C1, if all the components among the corresponding transformed distances, e.g. normalized distance values are smaller than a threshold Tc1; otherwise the segment k is assigned to cluster C2. Tc1 can be a pre-defined value, or can be calculated based on the statistics of values in Dk.

Figure 11:
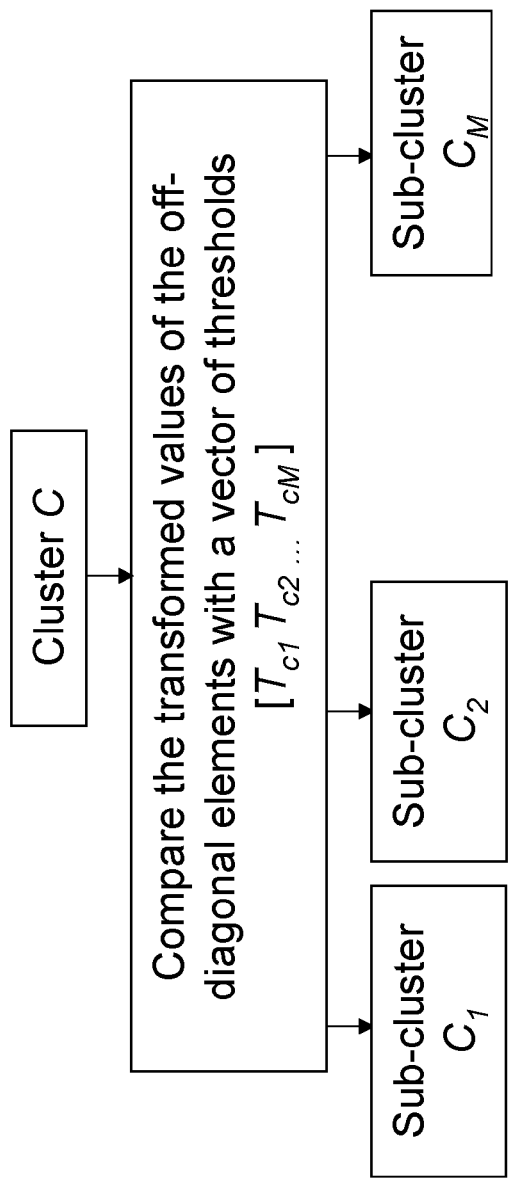
Figure 12:
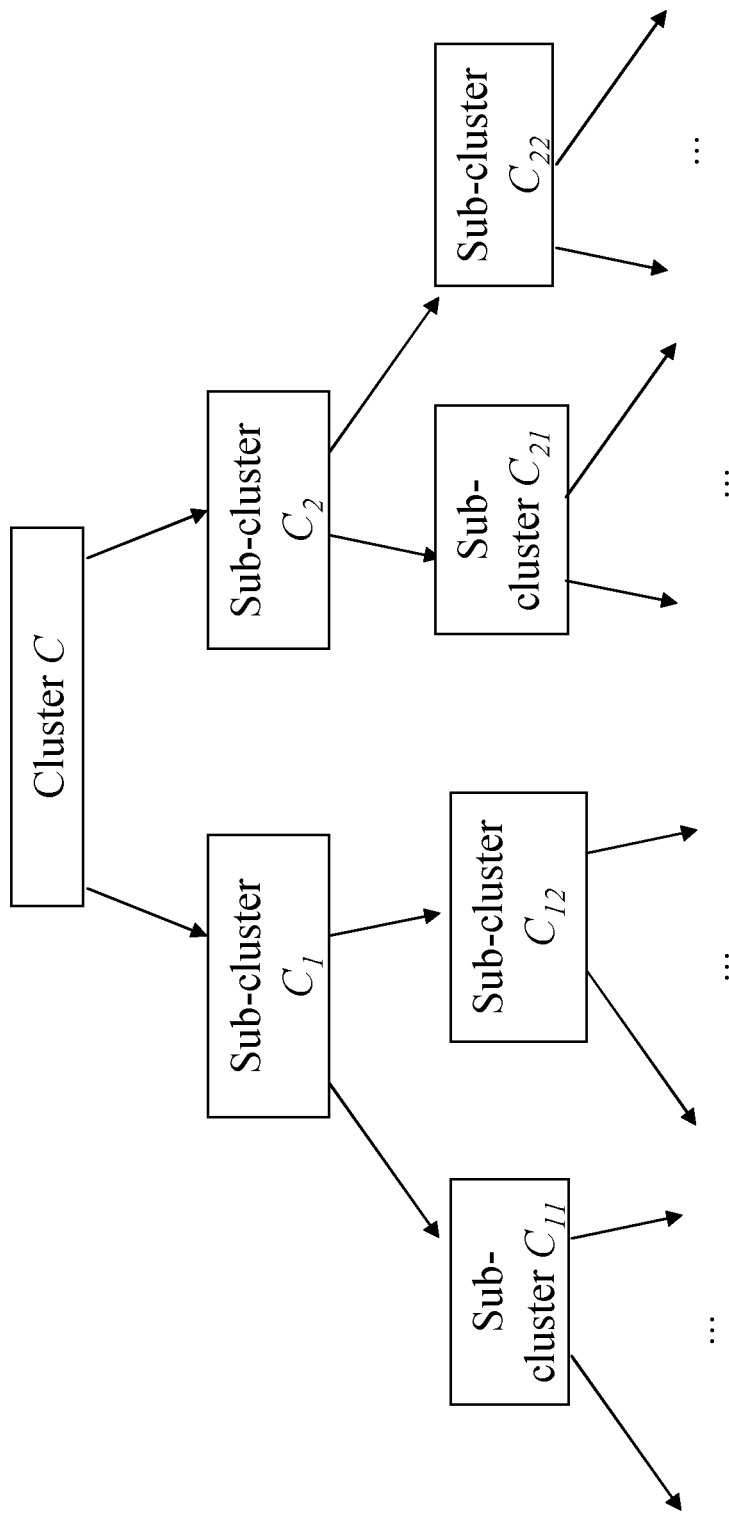

In a similar way, it is possible to define a vector of thresholds [Tc1 Tc2 . . . TcM], and split cluster C into M sub-clusters as illustrated in FIG. 11. Likewise, hierarchical sub-clustering is envisaged, similar to sub-clustering of B. This is depicted in the flowchart of FIG. 12.

Thus the embodiments of the present invention improve the consistency decision that assigns depth pixels to groups based on their intrinsic properties or properties of neighboring segments of the 3D component.

The cluster and sub-cluster specific threshold values can either be constant or time varying scalars or vectors. In the case of scalars, the threshold can be obtained as the weighted mean, median, weighted variance, or weighted sum of the mean and variance calculated for all the possible difference over all the segments in the cluster. An example of a time varying threshold is the case where motion information (temporal domain) tells us that there is a rapid scene change in a specific cluster. In that case the human eye loses its ability to track temporal inconsistencies. Therefore the threshold to be used to check for consistency can be different than a threshold for a static scene.

Figure 13:
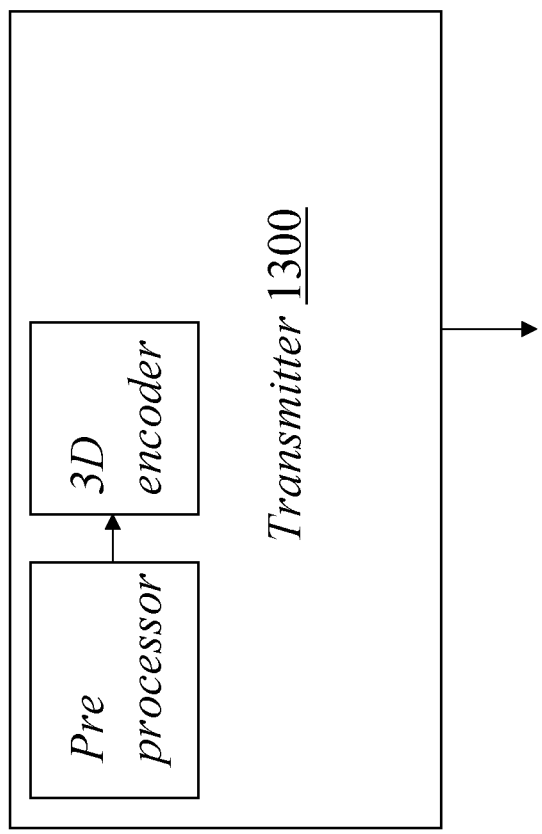
FIGS. 13 and 14 exemplify schematically different implementations according to embodiments of the present invention.

The method of the embodiments described above can be applied at the transmitter side. If the consistency checking and thresholding are done at the transmitter side, prior to encoding, a pre-processor can collect and process all the data according to the embodiments of the invention. The method is then implemented in a preprocessing step as illustrated in FIG. 13. In this way the multiple 3D scene representations are aligned before encoding, which typically results in increased coding efficiency. Accordingly, the method according to the embodiments of the present invention may be implemented in a pre-processor in a transmitter as illustrated in FIG. 13. Multiview texture, depth maps, occlusions etc. are further inputs to a 3D encoder in FIG. 13.

Figure 14:
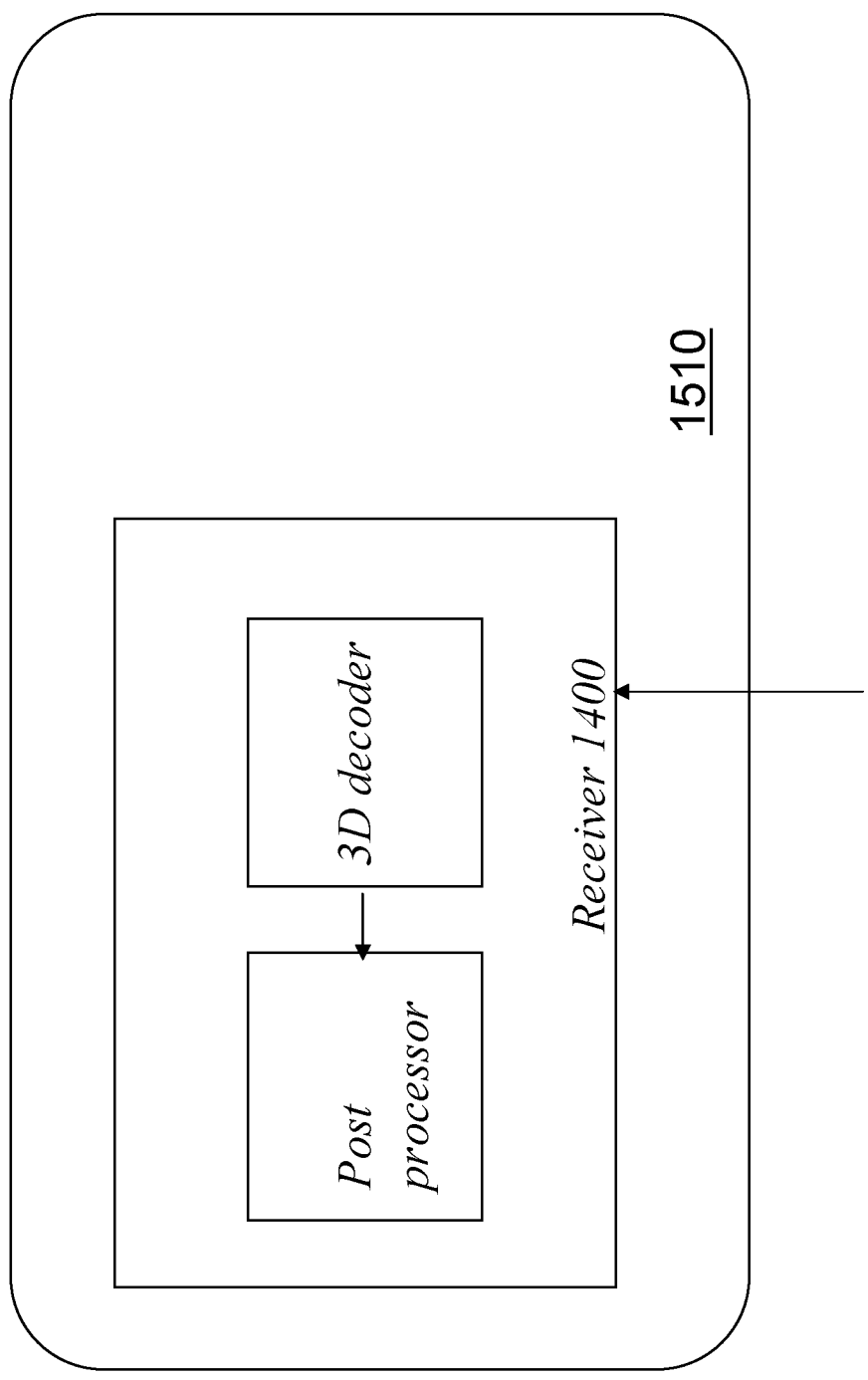

The method according to the embodiments can also, or instead, be applied at the receiver side as well after the decoding step in order to align decoded components and fix possible coding artifacts. Hence, the method according to the embodiments of the present invention may be implemented in a post-processor in a receiver 1400 as illustrated in FIG. 14. In that case, the receiver can be a 3D rendering device 1510, which may come as a separate box in case we have 3D-enabled TVs which are basically 2D TVs which is connectable to a "3D box" to enable a 3D functionality—like with shutter glasses, or it may be integrated in the 3D TV receiver (a "real" 3D TV).

Figure 15:
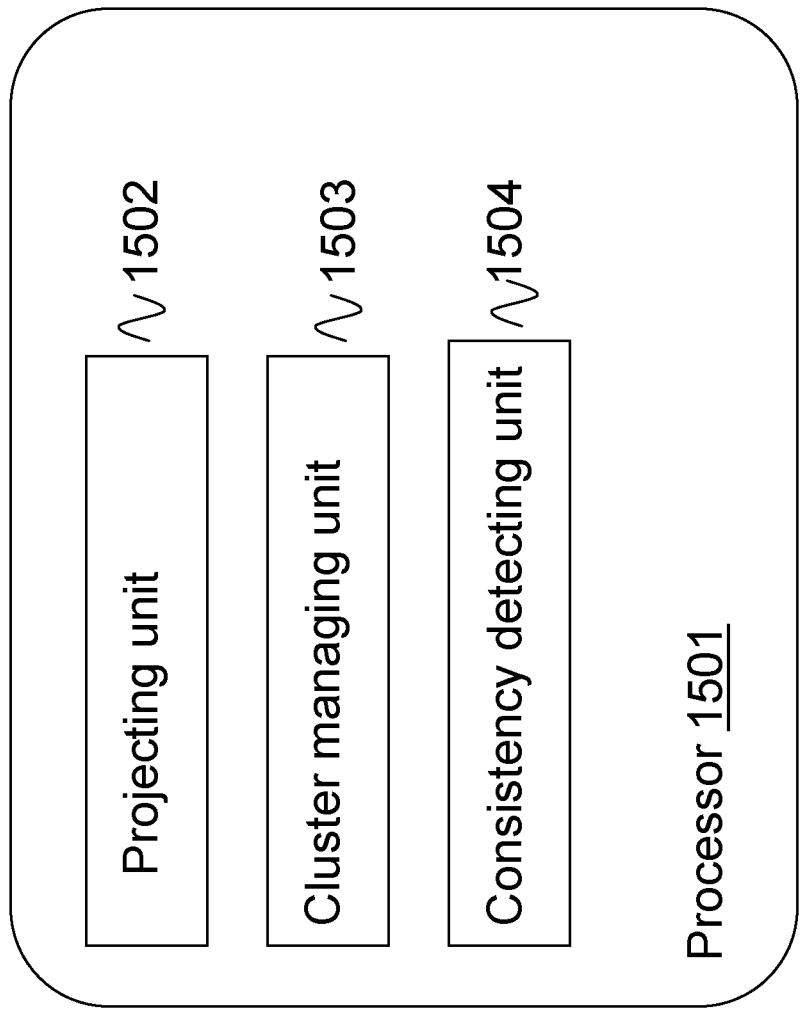
FIGS. 15 and 16 illustrate schematically a post/pre-processor according to embodiments of the present invention.

Turning now to FIG. 15, showing a processor according to embodiments of the present invention. The processor is exemplified by the post-processor and pre-processors as illustrated in FIGS. 13 and 14.

The post/pre-processor may comprise of one or more processing units.

As illustrated in FIG. 15 a processor 1501 for representing a 3D scene is provided. The processor 1501 comprises a projecting unit 1502 configured to project to a predefined view vF a 3D component of the 3D scene to be represented, captured at at least three different views v1, v2, v3 to determine a value for each of the projected 3D component captured at at least three different views v1,v2,v3. A cluster managing unit 1503 is configured to define clusters, wherein each cluster will be assigned a set of segments of a 3D component, to define for each cluster an individual rule for assigning segments of a 3D component to the respective cluster, and to assign each segment of the 3D component to a cluster based on the individual rules. Further the processor 1501 comprises a consistency detecting unit 1504 configured to detect consistency among the projected 3D components captured at at least three different views. The consistency detecting unit 1504 is further configured to compare entries of a distance matrix, indicative of distance differences between the at least three different views for the corresponding segment k when projected to the predefined view vF for each segment k, with a threshold matrix, wherein the threshold matrix is determined based on the segments of the cluster, and to determine consistency values for each cluster individually. The processor 1501 is configured to use the determined values and the consistency value when representing the 3D scene at the predefined view.

According to embodiments of the present invention, the cluster managing unit 1503 is configured to define the individual rule for assigning segments of a 3D component to the respective cluster which is dependent on the number of off-diagonal zero elements of the distance matrix.

In one embodiment, the cluster managing unit 1503 is configured to assign segments k having a corresponding distance matrix comprising off-diagonal elements which all are zero to a first cluster, also referred to cluster A.

The cluster managing unit 1503 may also be configured to assign segments k having a corresponding distance matrix comprising off-diagonal elements which are a mixture of zero and non-zero to a second cluster, also referred to cluster B.

In addition, the cluster managing unit 1503 may also be configured to assign segments k having a corresponding distance matrix comprising off-diagonal elements which all are non-zero to a third cluster, also referred to cluster C.

According to a further embodiment, the cluster managing unit 1503 is configured to assign the segments assigned to the second cluster to further sub-clusters based on sub-clustering criterion that consider also the off-diagonal elements.

According to another embodiment, the cluster managing unit 1503 is configured to assign the segments assigned to the third cluster to further sub-clusters based on sub-clustering criterion that consider also the non-zero off-diagonal elements.

Figure 16:
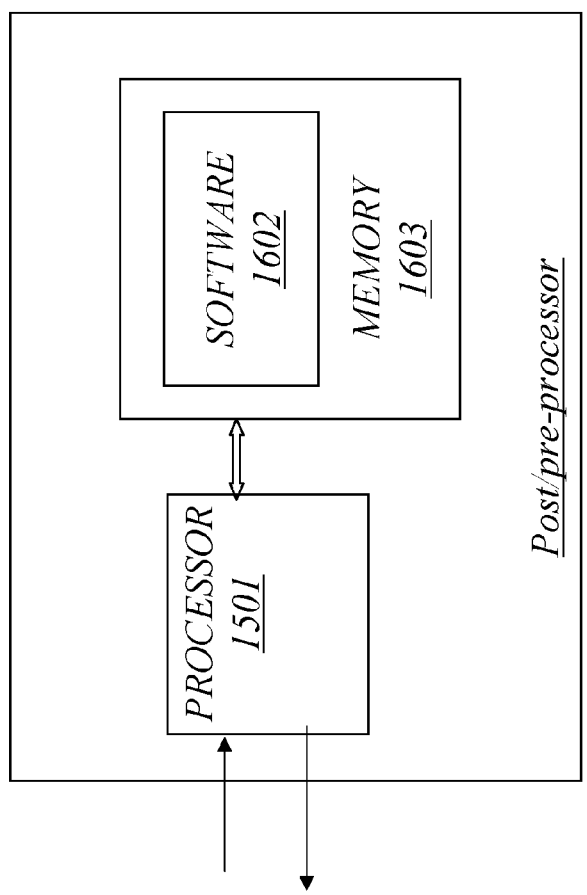

Moreover, the post/pre-processor of the receiver and transmitter may be realized by computer software 1602. The functionalities within the post/pre-processor can be implemented by a processor 1501 connected to a memory 1603 storing software code portions 1602 as illustrated in FIG. 16. The processor runs the software code portions to achieve the functionalities as illustrated in FIG. 15 for improving the 3D scene representation according to embodiments of the present invention of the post/pre-processor.

Modifications and other embodiments of the disclosed invention will come to mind to one skilled in the art having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method in a processor for representing a 3D scene, comprising:
   projecting to a predefined view a 3D component of the 3D scene to be represented, captured at least three different views,
   determining a value for each of the projected 3D component captured at least three different views,
   defining clusters, wherein each cluster will be assigned a set of segments of a 3D component,
   defining for each cluster an individual rule for assigning segments of a 3D component to the respective cluster,
   assigning each segment of the 3D component to a cluster based on the individual rules,
   detecting consistency among the projected 3D components captured at least three different views by:
      comparing entries of a distance matrix, indicative of distance differences between the at least three different views for the corresponding segment k when projected to the predefined view for each segment k, with a threshold matrix, wherein the threshold matrix is determined based on the segments of the cluster, and
      determining consistency values for each cluster individually,
   using the determined values and the consistency value when representing the 3D scene at the predefined view.

2. The method according to claim 1, wherein the individual rule for assigning segments of a 3D component to the respective cluster is dependent on the number of off-diagonal zero elements of the distance matrix.

3. The method according to claim 2, wherein segments k having a corresponding distance matrix comprising off-diagonal elements which all are zero are assigned to a first cluster.

4. The method according to claim 2, wherein segments k having a corresponding distance matrix comprising off-diagonal elements which are a mixture of zero and non-zero are assigned to a second cluster.

5. The method according to claim 2, wherein segments k having a corresponding distance matrix comprising off-diagonal elements which all are non-zero are assigned to a third cluster.

6. The method according to claim 4, wherein the segments assigned to the second cluster are assigned to further sub-clusters based on a sub-clustering criterion that consider also the off-diagonal elements.

7. The method according to claim 5, wherein the segments assigned to the third cluster are assigned to further sub-clusters based sub-clustering criterion that consider also the non-zero off-diagonal elements.

8. The method according to claim 1, wherein the 3D component is related to any of texture, maps, disparity, depth and occlusion information.

9. The method according to claim 1, wherein the consistency value of the projected views is an average value of the determined values associated with each projected view regarding the 3D component.

10. A processor for representing a 3D scene, comprising:
    a projecting unit configured to project to a predefined view a 3D component of the 3D scene to be represented, captured at least three different views to determine a value for each of the projected 3D component captured at least three different views,
    a cluster managing unit configured to define clusters, wherein each cluster will be assigned a set of segments of a 3D component, to define for each cluster an individual rule for assigning segments of a 3D component to the respective cluster, and to assign each segment of the 3D component to a cluster based on the individual rules,
    a consistency detecting unit configured to detect consistency among the projected 3D components captured at least three different views, the consistency detecting unit is further configured to compare entries of a distance matrix, indicative of distance differences between the at least three different views for the corresponding segment k when projected to the predefined view for each segment k, with a threshold matrix, wherein the threshold matrix is determined based on the segments of the cluster, and to determine consistency values for each cluster individually, wherein the processor is configured to use the determined values and the consistency value when representing the 3D scene at the predefined view.

11. The processor according to claim 10, wherein the cluster managing unit is configured to define the individual rule for assigning segments of a 3D component to the respective cluster which is dependent on the number of off-diagonal zero elements of the distance matrix.

12. The processor according to claim 11, wherein the cluster managing unit is configured to assign segments k having a corresponding distance matrix comprising off-diagonal elements which all are zero to a first cluster.

13. The processor according to claim 11, wherein the cluster managing unit is configured to assign segments k having a corresponding distance matrix comprising off-diagonal elements which are a mixture of zero and non-zero to a second cluster.

14. The processor according to claim 11, wherein the cluster managing unit is configured to assign segments k having a corresponding distance matrix comprising off-diagonal elements which all are non-zero to a third cluster.

15. The processor according to claim 13, wherein the cluster managing unit is configured to assign the segments assigned to the second cluster to further sub-clusters based on sub-clustering criterion that consider also the off-diagonal elements.

16. The processor according to claim 14, wherein the cluster managing unit is configured to assign the segments assigned to the third cluster to further sub-clusters based on sub-clustering criterion that consider also the non-zero off-diagonal elements.

17. The processor according to claim 10, wherein the 3D component is related to any of texture, maps, disparity, depth and occlusion information.

18. The processor according to claim 10, wherein the consistency value of the projected views is an average value of the determined values associated with each projected view regarding the 3D component.

19. A 3D rendering device comprising a processor according to claim 10.

20. The 3D rendering device according to claim 19, wherein the 3D rendering device is a 3D TV receiver.

21. The 3D rendering device according to claim 19, wherein the 3D rendering device is a 3D enabling box connectable to a TV receiver.

* * * * *